(12) United States Patent
Wajda et al.

(10) Patent No.: US 10,503,363 B2
(45) Date of Patent: Dec. 10, 2019

(54) LAZY SUSAN MENU GRAPHICAL USER INTERFACE

(71) Applicant: Zume, Inc., Mountain View, CA (US)

(72) Inventors: Chester Wajda, San Francisco, CA (US); James H. Tangeman, Jr., San Jose, CA (US)

(73) Assignee: Zume, Inc., Mountain View, CA (US)

( * ) Notice: Subject to any disclaimer, the term of this patent is extended or adjusted under 35 U.S.C. 154(b) by 206 days.

(21) Appl. No.: 15/341,977

(22) Filed: Nov. 2, 2016

(65) Prior Publication Data

US 2018/0121037 A1    May 3, 2018

(51) Int. Cl.
*G06F 3/048* (2013.01)
*G06F 3/0482* (2013.01)
*G06F 3/0481* (2013.01)
*G06F 3/0485* (2013.01)
*G06F 3/0488* (2013.01)

(52) U.S. Cl.
CPC .......... *G06F 3/0482* (2013.01); *G06F 3/0485* (2013.01); *G06F 3/04817* (2013.01); *G06F 3/04883* (2013.01)

(58) Field of Classification Search
CPC .............................. G06F 3/0485; G06F 3/0482
See application file for complete search history.

(56) References Cited

U.S. PATENT DOCUMENTS

| | | |
|---|---|---|
| 3,985,991 A | 10/1976 | Levinson |
| 4,373,636 A | 2/1983 | Hoffman |
| 4,632,836 A | 12/1986 | Abbott et al. |
| 4,718,769 A | 1/1988 | Conkey |
| 4,816,646 A | 3/1989 | Solomon et al. |
| 4,919,477 A | 4/1990 | Bingham et al. |
| 5,109,760 A | 5/1992 | Ansari |
| D326,749 S | 6/1992 | Apps et al. |
| 5,423,477 A | 6/1995 | Valdman et al. |
| 5,921,170 A | 7/1999 | Khatchadourian et al. |
| 5,997,924 A | 12/1999 | Olander, Jr. et al. |
| D426,646 S | 6/2000 | Monaghan et al. |
| 6,513,671 B2 | 2/2003 | Dicello et al. |
| 6,568,586 B1 | 5/2003 | VanEsley et al. |
| 6,755,122 B2 | 6/2004 | Holmes |

(Continued)

FOREIGN PATENT DOCUMENTS

| | | |
|---|---|---|
| DE | 296 06 255 U1 | 9/1996 |
| EP | 2 230 184 A1 | 9/2010 |

(Continued)

OTHER PUBLICATIONS

Advisory Action dated Aug. 27, 2015 for U.S. Appl. No. 13/920,998, Garden, "Systems and Methods of Preparing Food Products," 3 pages.

(Continued)

*Primary Examiner* — Claudia Dragoescu

(57) ABSTRACT

Systems and methods are disclosed for presenting items on a computer display for selection by a user. A subset of the items is arranged along an arc that stretches across the display, and the items can be scrolled based on user input. The user can select an item displayed along the arc to navigate to a separate display that has information about the selected item. Users can select items for purchase from the various displays.

59 Claims, 6 Drawing Sheets

(56) References Cited

U.S. PATENT DOCUMENTS

| | | | |
|---|---|---|---|
| 6,858,243 | B2 | 2/2005 | Blanchet et al. |
| 6,957,111 | B2 | 10/2005 | Zhu et al. |
| 7,127,984 | B2 | 10/2006 | Holmes |
| 7,505,929 | B2 | 3/2009 | Angert et al. |
| 7,678,036 | B1 | 3/2010 | Malitas et al. |
| 7,778,773 | B2 | 8/2010 | Yaqub et al. |
| 7,884,306 | B2 | 2/2011 | Leach |
| 7,984,667 | B2 | 7/2011 | Freudinger |
| 8,430,262 | B2 | 4/2013 | Corbett et al. |
| D682,304 | S | 5/2013 | Mierau et al. |
| 8,549,432 | B2 | 10/2013 | Warner |
| 8,561,823 | B1 | 10/2013 | Krupa |
| 8,663,419 | B2 | 3/2014 | Corbett et al. |
| D706,806 | S | 6/2014 | Nishizawa |
| 8,807,377 | B2 | 8/2014 | Corbett et al. |
| D720,227 | S | 12/2014 | Corbett et al. |
| D721,086 | S | 1/2015 | Hontz |
| 8,991,635 | B2 | 3/2015 | Myerscough |
| 9,010,621 | B2 | 4/2015 | Baker et al. |
| D736,810 | S | 8/2015 | Hisada et al. |
| D738,382 | S | 9/2015 | Lim et al. |
| 9,126,717 | B2 | 9/2015 | Myerscough |
| 9,126,719 | B2 | 9/2015 | Corbett et al. |
| D743,302 | S | 11/2015 | Weiner et al. |
| D743,311 | S | 11/2015 | Weiner et al. |
| D746,295 | S | 12/2015 | Arai et al. |
| D750,101 | S | 2/2016 | Bates et al. |
| D751,108 | S | 3/2016 | Caldwell |
| 9,292,889 | B2 | 3/2016 | Garden |
| D753,685 | S | 4/2016 | Zimmerman et al. |
| D754,250 | S | 4/2016 | Elmer |
| D759,061 | S | 6/2016 | Sahoo et al. |
| D760,740 | S | 7/2016 | Agostini et al. |
| 9,387,786 | B2 | 7/2016 | Weiner et al. |
| D763,278 | S | 8/2016 | Cavander et al. |
| D763,306 | S | 8/2016 | Lee et al. |
| D767,619 | S | 9/2016 | Lin |
| 9,446,889 | B2 | 9/2016 | Lopes et al. |
| D774,900 | S | 12/2016 | Longoni et al. |
| 9,522,761 | B2 | 12/2016 | Baker et al. |
| D775,657 | S | 1/2017 | Thomas et al. |
| D778,312 | S | 2/2017 | Goodwin et al. |
| D778,314 | S | 2/2017 | Li et al. |
| D781,882 | S | 3/2017 | Rad et al. |
| D783,659 | S | 4/2017 | Park |
| 9,815,191 | B2 | 11/2017 | Oleynik |
| D820,877 | S | 6/2018 | Inman et al. |
| D821,438 | S | 6/2018 | Denis et al. |
| D821,441 | S | 6/2018 | Wilberding et al. |
| D824,404 | S | 7/2018 | Di Nicola et al. |
| D826,975 | S | 8/2018 | Baker et al. |
| D834,043 | S | 11/2018 | Di Nicola et al. |
| 10,209,810 | B2 | 2/2019 | Anzures et al. |
| D843,392 | S | 3/2019 | Timmer et al. |
| D847,160 | S | 4/2019 | Laflamme |
| 2002/0048624 | A1 | 4/2002 | Blanchet et al. |
| 2003/0037681 | A1 | 2/2003 | Zhu et al. |
| 2004/0212617 | A1* | 10/2004 | Fitzmaurice .......... G06F 3/0481 345/440 |
| 2007/0094090 | A1 | 4/2007 | Jenkins et al. |
| 2008/0023459 | A1 | 1/2008 | Leach |
| 2008/0275643 | A1 | 11/2008 | Yaqub et al. |
| 2009/0048890 | A1 | 2/2009 | Burgh |
| 2009/0057381 | A1 | 3/2009 | Gokhale |
| 2010/0083180 | A1* | 4/2010 | Matsubara ............ G06F 3/0481 715/834 |
| 2010/0200591 | A1 | 8/2010 | Myerscough |
| 2010/0306702 | A1 | 12/2010 | Warner |
| 2011/0036846 | A1 | 2/2011 | Corbett et al. |
| 2011/0220652 | A1 | 9/2011 | Corbett et al. |
| 2012/0024859 | A1 | 2/2012 | Longoni et al. |
| 2012/0024897 | A1 | 2/2012 | Corbett et al. |
| 2012/0175367 | A1 | 7/2012 | Lopes et al. |
| 2013/0174092 | A1* | 7/2013 | Li ....................... G06F 3/04847 715/823 |
| 2013/0219340 | A1* | 8/2013 | Linge ................... G06F 3/0482 715/834 |
| 2014/0282265 | A1* | 9/2014 | Shaich ................. G06F 3/0482 715/841 |
| 2014/0370167 | A1 | 12/2014 | Garden |
| 2015/0019354 | A1 | 1/2015 | Chan et al. |
| 2015/0046877 | A1 | 2/2015 | Cuppari et al. |
| 2015/0068945 | A1 | 3/2015 | Baker et al. |
| 2015/0068946 | A1 | 3/2015 | Baker et al. |
| 2015/0343933 | A1 | 12/2015 | Weiner et al. |
| 2015/0343936 | A1 | 12/2015 | Weiner et al. |
| 2016/0162833 | A1 | 6/2016 | Garden |
| 2017/0124670 | A1 | 5/2017 | Becker et al. |
| 2017/0323375 | A1* | 11/2017 | Slater ................... A61B 5/0484 |
| 2018/0071939 | A1 | 3/2018 | Garden et al. |
| 2018/0105344 | A1 | 4/2018 | Chiang et al. |

FOREIGN PATENT DOCUMENTS

| | | |
|---|---|---|
| EP | 1 685 045 B2 | 12/2014 |
| JP | 2002-347944 A | 12/2002 |
| JP | 5244344 B2 | 7/2013 |
| KR | 10-2009-0098949 A | 9/2009 |
| KR | 10-2014-0125612 A | 10/2014 |
| KR | 20-2015-0002052 U | 5/2015 |
| WO | 2012/005683 A1 | 1/2012 |
| WO | 2016/169654 A1 | 10/2016 |
| WO | 2017/019501 A1 | 2/2017 |

OTHER PUBLICATIONS

Advisory Action dated Jul. 29, 2015 for U.S. Appl. No. 13/920,998, Garden, "Systems and Methods of Preparing Food Products," 3 pages.

Chiang et al., "Container for Transport and Storage of Food Products," U.S. Appl. No. 62/311,787, filed Mar. 22, 2016, 50 pages.

Extended European Search Report, dated Jun. 22, 2016, for European Application No. 14814044.5-1757 / 2984618, 8 pages.

Garden, "Systems and Methods of Preparing Food Products," Amendment, filed Apr. 2, 2015 for U.S. Appl. No. 13/920,998, 23 pages.

Garden, "Systems and Methods of Preparing Food Products," Amendment, filed Aug. 10, 2015 for U.S. Appl. No. 13/920,998, 29 pages.

Garden, "Systems and Methods of Preparing Food Products," Amendment, filed Jul. 22, 2015 for U.S. Appl. No. 13/920,998, 29 pages.

Garden, "Systems and Methods of Preparing Food Products," Amendment, filed Sep. 25, 2015 for U.S. Appl. No. 13/920,998, 29 pages.

Garden, "System and Methods of Preparing Food Products," Response to Restriction Requirement, filed Oct. 24, 2014, for U.S. Appl. No. 13/920,998, 3 pages.

Garden, "System and Methods of Preparing Food Products," U.S. Appl. No. 15/040,866, filed Feb. 10, 2016, 71 pages.

International Search Report, dated Oct. 22, 2014, for International Application No. PCT/US2014/042879, 3 pages.

Notice of Allowance, dated Jan. 7, 2016, for U.S. Appl. No. 13/920,998, Garden, "System and Methods of Preparing Food Products," 9 pages.

Office Action dated Mar. 16, 2015 for U.S. Appl. No. 13/920,998, Garden, "Systems and Methods of Preparing Food Products," 28 pages.

Office Action dated May 27, 2015 for U.S. Appl. No. 13/920,998, Garden, "Systems and Methods of Preparing Food Products," 31 pages.

Restriction Requirement, dated Sep. 10, 2014, for U.S. Appl. No. 13/920,998, Garden, "Systems and Methods of Preparing Food Products," 5 pages.

Written Opinion, dated Oct. 22, 2014, for International Application No. PCT/US2014/042879, 8 pages.

Becker et al., "A System and Process for Managing Preparation and Packaging of Food and/or Beverage Products for a Precise Delivery Time," U.S. Appl. No. 15/217,314, filed Jul. 22, 2016, 75 pages.

(56) References Cited

OTHER PUBLICATIONS

Nourish Technology, "Teaching robots how to cook," downloaded from https://angel.co/nourish-technology, on Jul. 12, 2017, 6 pages.
International Search Report and Written Opinion of the International Searching Authority, dated Feb. 13, 2018, for International Application No. PCT/US2017/059386, 10 pages.
"Circle SideBar for Android." portalprogramas.com. Date not available. Accessed Jan. 18, 2019. Available online at URL: <https://www.portalprogramas.com/en/circle-sidebar/android/> (Year: N/A).
U.S. Appl. No. 29/641,213.
U.S. Appl. No. 29/641,239.

\* cited by examiner

LAZY SUSAN MENU GRAPHICAL USER INTERFACE

BACKGROUND

Technical Field

This disclosure generally relates to technology for providing a graphical user interface for selecting items.

Description of the Related Art

Various types and configurations of user interfaces enable customers to make selections of items from a computing or mobile device. The user interfaces should be intuitive to use, and because of the small display on mobile devices, should provide sufficient information for a customer to make a choice but not so much information that the customer becomes overwhelmed or the information clutters the screen or display of the computing or mobile device. Moreover, because the user interface may provide one of the first points of contact between a merchant and a customer remotely placing an order, the user interface should provide a positive experience for the customer during the selection and ordering processes.

A typical user interface employs a pull or drag or drop down menu in which an ordered list of user selectable elements or icons are displayed in response to a selection of the pull or drag down menu. The limited size of a screen or display of a mobile device (e.g., smartphone) limits the total number of user selectable elements or icons that can be displayed at a reasonable size (e.g., font size) via a pull or drag or drop down menu.

BRIEF SUMMARY

A method of operation in a device to display at least some of a set of user-selectable item icons may be summarized as including initially causing a presentation of a first subset of the set of user-selectable item icons on a screen, in which a plurality of the user-selectable item icons comprising the first subset are angularly arrayed along an arc; in response to a first scroll input, causing a series of iterative presentations of the user-selectable item icons comprising the first subset in which the user-selectable item icons comprising the first subset are presented at a plurality of successive angular positions along the arc in a first direction along the arc; and as one of the user-selectable item icons that is part of the first subset iterates angularly past a second end of the arc, causing a presentation proximate a first end of the arc of at least a portion of a user-selectable item icon of the set of user-selectable item icons that was not part of the first subset of the set of user-selectable item icons. Causing a series of iterative presentations of the user-selectable item icons including the first subset in which the user-selectable item icons including the first subset are presented at a plurality of successive angular positions along the arc in a first direction along the arc may include causing the series of iterative presentations of the user-selectable item icons in which the plurality of the user-selectable icons comprising the first subset are angularly arrayed at equally spaced intervals along the arc where the arc is about a virtual point, the virtual point which is off of the screen.

The method may further include detecting a first swipe as the first scroll input. Detecting the first swipe may include detecting the first swipe which extends predominately in the first direction along the arc.

The method may further include in response to a second scroll input, causing a series of iterative presentations of the user-selectable item icons comprising a second subset in which the user-selectable item icons comprising the second subset are presented at a plurality of successive angular positions along the arc; and as one of the user-selectable item icons that is part of the second subset iterates angularly past one end of the arc, causing a presentation proximate another end of the arc of at least a portion of a user-selectable item icon of the set of user-selectable item icons that was not part of the second subset. The screen may have a first edge and at least a second edge, the second edge opposed to the first edge, and wherein causing a presentation proximate a first end of the arc of at least a portion of a user-selectable item icon of the set of user-selectable item icons that was not part of the first subset may include causing the presentation to iteratively present a progressively increasing portion of the user-selectable item icon that was not part of the first subset entering the screen along the first edge thereof. Causing a presentation proximate another end of the arc of at least a portion of a user-selectable item icon of the set of user-selectable item icons that was not part of the second subset may include causing the presentation to iteratively present a progressively decreasing portion of the user-selectable item icon that was not part of the first subset exiting the screen along the first edge thereof. The screen has a first edge, a second edge, a third edge, and a fourth edge, a first corner where the first edge may intersect the third edge and a second corner where the second edge may intersect the third edge, and wherein causing a presentation proximate a first end of the arc of at least a portion of a user-selectable item icon of the set of user-selectable item icons that was not part of the first subset may include causing the presentation to iteratively present a progressively increasing portion of the user-selectable item icon that was not part of the first subset entering the screen at the first corner. Causing a presentation proximate another end of the arc of at least a portion of a user-selectable item icon of the set of user-selectable item icons that was not part of the second subset may include causing the presentation to iteratively present a progressively decreasing portion of the user-selectable item icon that was not part of the first subset exiting the screen at the second corner.

The method may further include detecting a second swipe that extends predominately in the first direction along the arc as the second scroll input.

The method may further include detecting a second swipe that extends predominately in a second direction along the arc as the second scroll input, the second direction opposed to the first direction. Causing iterative presentations of the user-selectable item icons may include causing iterative presentations of respective images of respective items the images which can be selected via an input.

The method may further include in response to a selection of one of the user-selectable item icons, presenting a close up image of a portion of respective item.

The method may further include in response to a selection of one of the user-selectable item icons, presenting a close up image of a portion of the respective item, along with a set of ingredients that comprise the respective item.

The method may further include in response to a selection of one of the user-selectable item icons, presenting a close up image of a portion of the respective item, along with a set of names and a graphic representation of each of a plurality of ingredients that comprise the respective item.

The method may further include in response to a selection of one of the user-selectable item icons, presenting a close up image of a portion of the respective item, along with a set of names and a graphic representation of each of a plurality of ingredients that comprise the respective item, and along with a user-selectable add icon, selection of which increments a number of the respective items in an order list.

The method may further include in response to a selection of one of the user-selectable item icons, presenting a close up image of a portion of the respective item, along with a set of names and a graphic representation of each of a plurality of ingredients that comprise the respective item, a user-selectable add icon along with in indication of a price of the respective icon; and in response to a selection of the user-selectable add icon, incrementing a number of the respective items in an order list. Causing a series of iterative presentations of the user-selectable item icons including the first subset in which the user-selectable item icons including the first subset are presented at a plurality of successive angular positions along the arc in a first direction along the arc may include causing the iterative presentations of respective images of respective items each with a fixed orientation relative to the screen, the orientation of each of the images relative to the screen being the same at each of the successive angular positions along the arc.

The method may further include causing a presentation of a number of user-selectable add icons angularly arrayed with one another, each user-selectable add icon presented alongside a respective one of the user-selectable item icons at each iterative position at which the user-selectable item icon is presented.

The method may further include in response to a selection of one of the user-selectable add icons, incrementing a number of the respective items in an order list.

The method may further include causing a presentation of a number of item names angularly arrayed with one another, each item name presented alongside a respective one of the user-selectable item icons at each successive angular position at which the user-selectable item icon is presented. Causing a presentation of a number of item names angularly arrayed with one another may include causing the presentation of the number of item names at each of the successive angular positions along the arc where each of the items names has a fixed orientation relative to the screen, the orientation of each of the item names relative to the screen being the same at each of the successive angular positions along the arc.

The method may further include causing a presentation of a number of textual descriptions angularly arrayed with one another, each textual descriptions presented alongside a respective one of the user-selectable item icons at each iterative position at which the user-selectable item icon is presented. Causing a presentation of a number of textual descriptions angularly arrayed with one another may include causing the presentation of the number of textual descriptions at each of the successive angular positions along the arc where each of the textual descriptions has a fixed orientation relative to the screen, the orientation of each of the textual descriptions relative to the screen being the same at each of the successive angular positions along the arc.

The method may further include causing a presentation of a number of item prices angularly arrayed with one another, each item price presented alongside a respective one of the user-selectable item icons at each successive angular position at which the user-selectable item icon is presented. Causing a presentation of a number of item prices angularly arrayed with one another may include causing the presentation of the number of item prices at each of the successive angular positions along the arc where each of the items prices has a fixed orientation relative to the screen, the orientation of each of the item prices relative to the screen being the same at each of the successive angular positions along the arc.

The method may further include causing a presentation of a menu of user selectable delivery locations.

A device to display at least some of a set of user-selectable item icons may be summarized as including a screen; circuitry including at least one processor communicatively coupled to the screen; at least one nontransitory processor-readable medium communicatively coupled to the at least one processor and that stores at least one of processor-executable instructions or data which, when executed by the at least one processor, causes the at least one processor to: initially cause a presentation of a first subset of the set of user-selectable item icons on a screen, in which a plurality of the user-selectable item icons comprising the first subset are angularly arrayed along an arc; in response to a first scroll input, cause a series of iterative presentations of the user-selectable item icons comprising the first subset in which the user-selectable item icons comprising the first subset are presented at a plurality of successive angular positions along the arc in a first direction along the arc; and as one of the user-selectable item icons that is part of the first subset iterates angularly past a second end of the arc, cause a presentation proximate a first end of the arc of at least a portion of a user-selectable item icon of the set of user-selectable item icons that was not part of the first subset. Cause a series of iterative presentations of the user-selectable item icons including the first subset in which the user-selectable item icons including the first subset are presented at a plurality of successive angular positions along the arc in a first direction along the arc may include to cause the series of iterative presentations of the user-selectable item icons in which the plurality of the user-selectable icons including the first subset are angularly arrayed at equally spaced intervals along the arc where the arc is about a virtual point, the virtual point which is off of the screen.

The executable instructions or data which, when executed by the at least one processor, may cause the at least one processor to further detect a first swipe as the first scroll input. To detect the first swipe may include to detect the first swipe which extends predominately in the first direction along the arc.

The executable instructions or data which, when executed by the at least one processor, may cause the at least one processor to further in response to a second scroll input, cause a series of iterative presentations of the user-selectable item icons comprising a second subset in which the user-selectable item icons comprising the second subset are presented at a plurality of successive angular positions along the arc; and as one of the user-selectable item icons that is part of the second subset iterates angularly past one end of the arc, cause a presentation proximate another end of the arc of at least a portion of a user-selectable item icon of the set of user-selectable item icons that was not part of the second subset. The screen may have a first edge and at least a second edge, the second edge opposed to the first edge, and wherein to cause a presentation proximate a first end of the arc of at least a portion of a user-selectable item icon of the set of user-selectable item icons that was not part of the first subset may include to cause the presentation to iteratively present a progressively increasing portion of the user-selectable item icon that was not part of the first subset entering the screen along the first edge thereof. To cause a presentation proximate another end of the arc of at least a portion of a user-selectable item icon of the set of user-selectable item icons that was not part of the second subset may include to cause the presentation to iteratively present a progressively decreasing portion of the user-selectable item icon that was not part of the first subset exiting the screen along the first edge thereof. The screen may have a first edge, a second edge, a third edge, and a fourth edge, a first corner where the first edge may intersect the third edge and a second corner where the second edge may intersect the third edge, and wherein to cause a presentation proximate a first end of the arc of at least a portion of a user-selectable item icon of the set of user-selectable item icons that was not part of the first subset may include to cause the presentation to iteratively present a progressively increasing portion of the user-selectable item icon that was not part of the first subset entering the screen at the first corner. To cause a presentation proximate another end of the arc of at least a portion of a user-selectable item icon of the set of user-selectable item icons that was not part of the second subset may include to cause the presentation to iteratively present a progressively decreasing portion of the user-selectable item icon that was not part of the first subset exiting the screen at the second corner.

The executable instructions or data which, when executed by the at least one processor, may cause the at least one processor to further detect a second swipe that extends predominately in the first direction along the arc as the second scroll input.

The executable instructions or data which, when executed by the at least one processor, may cause the at least one processor to further detect a second swipe that extends predominately in a second direction along the arc as the second scroll input, the second direction opposed to the first direction. To cause iterative presentations of the user-selectable item icons may include to cause iterative presentations of respective images of respective items the images which can be selected via an input.

The executable instructions or data which, when executed by the at least one processor, may cause the at least one processor to further in response to a selection of one of the user-selectable item icons, present a close up image of a portion of respective item. The executable instructions or data which, when executed by the at least one processor, may cause the at least one processor to further in response to a selection of one of the user-selectable item icons, present a close up image of a portion of the respective item, along with a set of ingredients that comprise the respective item.

The executable instructions or data which, when executed by the at least one processor, may cause the at least one processor to further in response to a selection of one of the user-selectable item icons, present a close up image of a portion of the respective item, along with a set of names and a graphic representation of each of a plurality of ingredients that comprise the respective item.

The executable instructions or data which, when executed by the at least one processor, may cause the at least one processor to further in response to a selection of one of the user-selectable item icons, present a close up image of a portion of the respective item, along with a set of names and a graphic representation of each of a plurality of ingredients that comprise the respective item, and along with a user-selectable add icon, selection of which increments a number of the respective items in an order list.

The executable instructions or data which, when executed by the at least one processor, may cause the at least one processor to further in response to a selection of one of the user-selectable item icons, present a close up image of a portion of the respective item, along with a set of names and a graphic representation of each of a plurality of ingredients that comprise the respective item, a user-selectable add icon along with in indication of a price of the respective icon; and in response to a selection of the user-selectable add icon, increment a number of the respective items in an order list. To cause a series of iterative presentations of the user-selectable item icons including the first subset in which the user-selectable item icons including the first subset are presented at a plurality of successive angular positions along the arc in a first direction along the arc may include to cause the iterative presentations of respective images of respective items each with a fixed orientation relative to the screen, the orientation of each of the images relative to the screen being the same at each of the successive angular positions along the arc.

The executable instructions or data which, when executed by the at least one processor, may cause the at least one processor to further cause a presentation of a number of user-selectable add icons angularly arrayed with one another, each user-selectable add icon presented alongside a respective one of the user-selectable item icons at each iterative position at which the user-selectable item icon is presented.

The executable instructions or data which, when executed by the at least one processor, may cause the at least one processor to further in response to a selection of one of the user-selectable add icons, increment a number of the respective items in an order list.

The executable instructions or data which, when executed by the at least one processor, may cause the at least one processor to further cause a presentation of a number of item names angularly arrayed with one another, each item name presented alongside a respective one of the user-selectable item icons at each successive angular position at which the user-selectable item icon is presented. To cause a presentation of a number of item names angularly arrayed with one another may include to cause the presentation of the number of item names at each of the successive angular positions along the arc where each of the items names has a fixed orientation relative to the screen, the orientation of each of the item names relative to the screen being the same at each of the successive angular positions along the arc.

The executable instructions or data which, when executed by the at least one processor, may cause the at least one processor to further cause a presentation of a number of textual descriptions angularly arrayed with one another, each textual description presented alongside a respective one of the user-selectable item icons at each iterative position at which the user-selectable item icon is presented. To cause a presentation of a number of textual descriptions angularly arrayed with one another may include to cause the presentation of the number of textual descriptions at each of the successive angular positions along the arc where each of the textual descriptions has a fixed orientation relative to the screen, the orientation of each of the textual descriptions relative to the screen being the same at each of the successive angular positions along the arc.

The executable instructions or data which, when executed by the at least one processor, may cause the at least one processor to further cause a presentation of a number of item prices angularly arrayed with one another, each item price presented alongside a respective one of the user-selectable item icons at each successive angular position at which the user-selectable item icon is presented. To cause a presentation of a number of item prices angularly arrayed with one another may include to cause the presentation of the number of item prices at each of the successive angular positions along the arc where each of the items prices has a fixed orientation relative to the screen, the orientation of each of the item prices relative to the screen being the same at each of the successive angular positions along the arc.

The executable instructions or data which, when executed by the at least one processor, may cause the at least one processor to further cause a presentation of a menu of user selectable delivery locations.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and methods associated with graphical user interfaces, smartphones, technology for receiving and processing input received through a touchscreen display, closed-loop controllers used to control processing conditions, and wired and wireless communications protocols have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
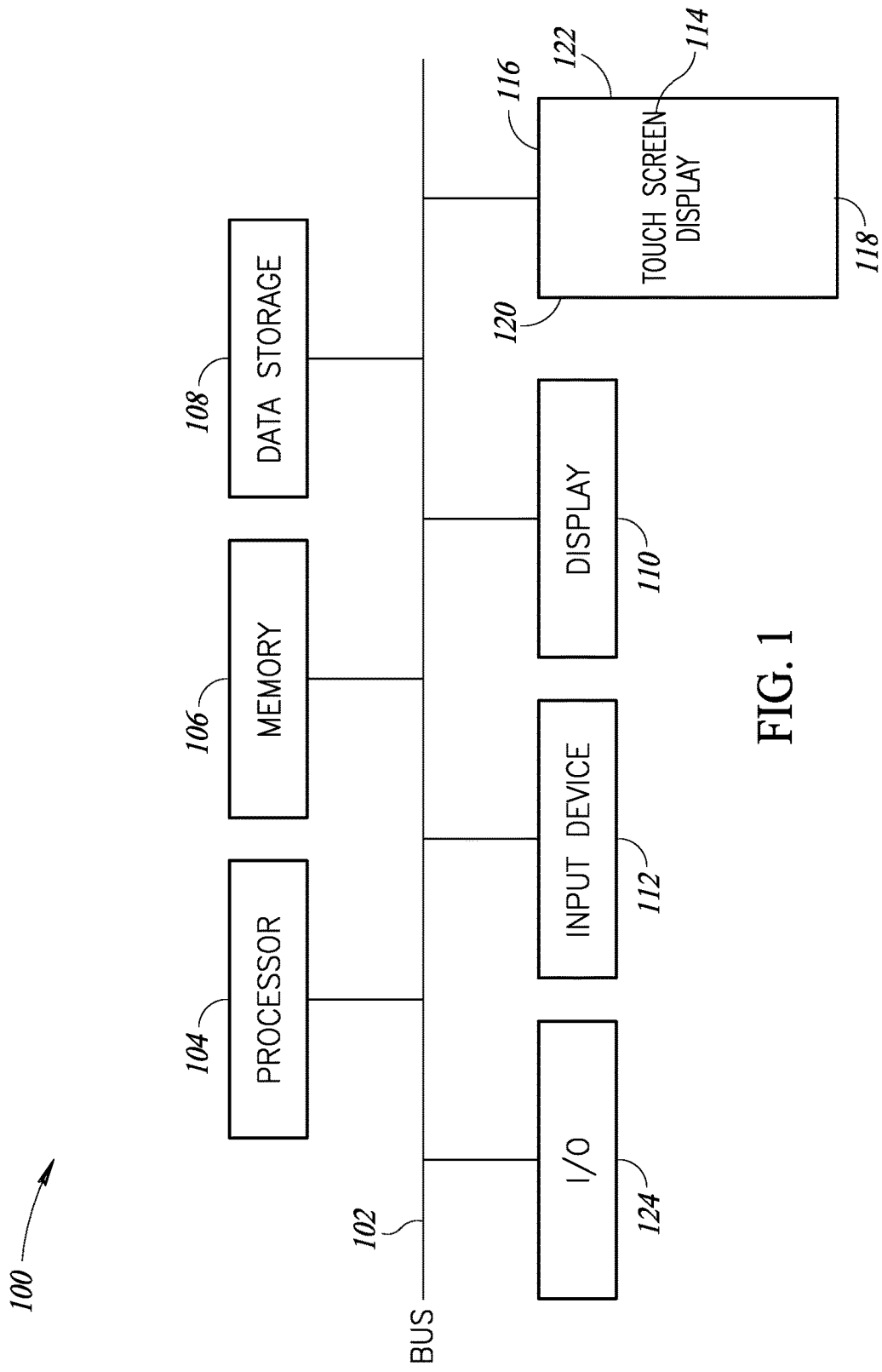
FIG. 1 is a block diagram of a device usable to render a graphical user interface that displays at least some of a set of user-selectable item icons along an arc, according to at least one illustrated embodiment.

FIG. 1 shows a computer system 100 that generates graphical user interfaces, according to the techniques is described herein.

The computer system 100 includes a bus 102 connecting one or more processor(s) 104, one or more memories 106, one or more data storage devices 108, a display 110, one or more input devices 112, one or more touchscreen displays 114, and one or more I/O ports 124. The computer system 100 includes instructions stored in data storage device 108, or on any other non-transitory processor-readable medium. When executed, these instructions, amongst other things, cause the processor(s) 104 to generate a graphical user interface and to manipulate the graphical user interface based on inputs received by the computer system 100. The instructions and data to implement the graphical user interface are stored in memory 106 or other nontransitory processor-readable media. The processor(s) 104 displays the resulting graphical user interface stored in memory 106 by rendering the graphical user interface to be viewed via the display 110. The selections and input used to control the graphical user interface are entered via an input device 112, which may be embodied as one or more of the following: a touchscreen display 114, a keyboard, a keypad, a mouse, a trackball, a track pad, and the like. The display and the input device may be embodied by the touchscreen display 114 that has a top edge 116, a bottom edge 118 that is opposite the top edge 116, and two opposing side edges (e.g., first side edge 120 and second side edge 122). The two opposing side edges 120 and 122 may each extend at 90° angles to the top edge 116 and the bottom edge 118. The top edge 116, the bottom edge 118, and the two side edges 120 and 122 define a plane that contains a screen for the touchscreen display 114.

In at least some implementations, the computer system 100 may include one or more wired and/or wireless communication interfaces 124 which allow data and/or instructions to be communicated using a network. The communication interfaces 124 may include one or more cellular transceivers or radios, one or more WI-FI® transceivers or radios, and one or more BLUETOOTH® transceivers or radios, along with respective associated antennas. Accordingly, the computer system 100 may be a smart phone or tablet computer that is capable of communicating via cellular, WI-FI®, and BLUETOOTH® and similar communications. Non-limiting examples of cellular communications transceivers or radios include a CDMA transceiver, a GSM transceiver, a 3G transceiver, a 4G transceiver, an LTE transceiver, and any similar current or future developed mobile device transceiver having at least one of a voice telephony capability or a graphical data exchange capability. In at least some instances, the cellular transceivers or radios can include more than one interface. For example, in some instances, the cellular transceivers or radios can include at least one dedicated, full- or half-duplex voice call interface and at least one dedicated data interface. In other instances, the cellular transceivers or radios can include at least one integrated interface capable of contemporaneously accommodating both full- or half-duplex voice calls and data transfer. Non-limiting examples of WI-FI® transceivers or radios include various chipsets available from Broadcom, including BCM43142, BCM4313, BCM94312MC, BCM4312, and WI-FI® chipsets available from Atmel, Marvell, or Redpine. Non-limiting examples of WI-FT® transceivers or radios include various chipsets available from Broadcom, Texas Instruments and Redpine.

The processor(s) 104 includes any circuitry that executes instructions or logic, for instance microprocessors (single or multi-core), central processor units (CPUs), micro-controllers, digital signal processors (DSPs), graphical processor units (GPUs), application specific integrated circuits (ASICs), programmable gate arrays (PGAs), programmable logic controllers (PLCs), field programmable gate arrays (FPGAs), application-specific integrated circuits (ASICs), etc. The processor(s) 104 may, for example, take the form of processors commonly used in mobile devices (e.g., smartphones, personal digital assistants (PDAs), e-readers, tablet computers, laptop computers, netbook computers, and/or personal computers (PCs)), capable of executing instructions to generate a graphical user interface, receive commands and inputs related to the graphical user interface, and manipulate the graphical user interface based on the received commands and inputs. Furthermore, the processor 104 may include multiple cores for simultaneous and parallel execution. The bus 102 can employ any known bus structures or architectures, including a memory bus with memory controller, a peripheral bus, and/or a local bus. The memory 106 includes read-only memory ("ROM"), random-access memory ("RAM"), any type of nontransitory volatile and/or non-volatile memory, a hard disk drive, an optical disk drive, a magnetic disk drive, etc. The data storage 108 may include a hard disk, optical disk, magnetic disk, or other types of computer-readable media that can store data accessible by a computer, such as WORM drives, RAID drives, magnetic cassettes, flash memory cards, digital video disks ("DVD"), Bernoulli cartridges, RAMs, ROMs, smart cards, etc.

Figure 2:
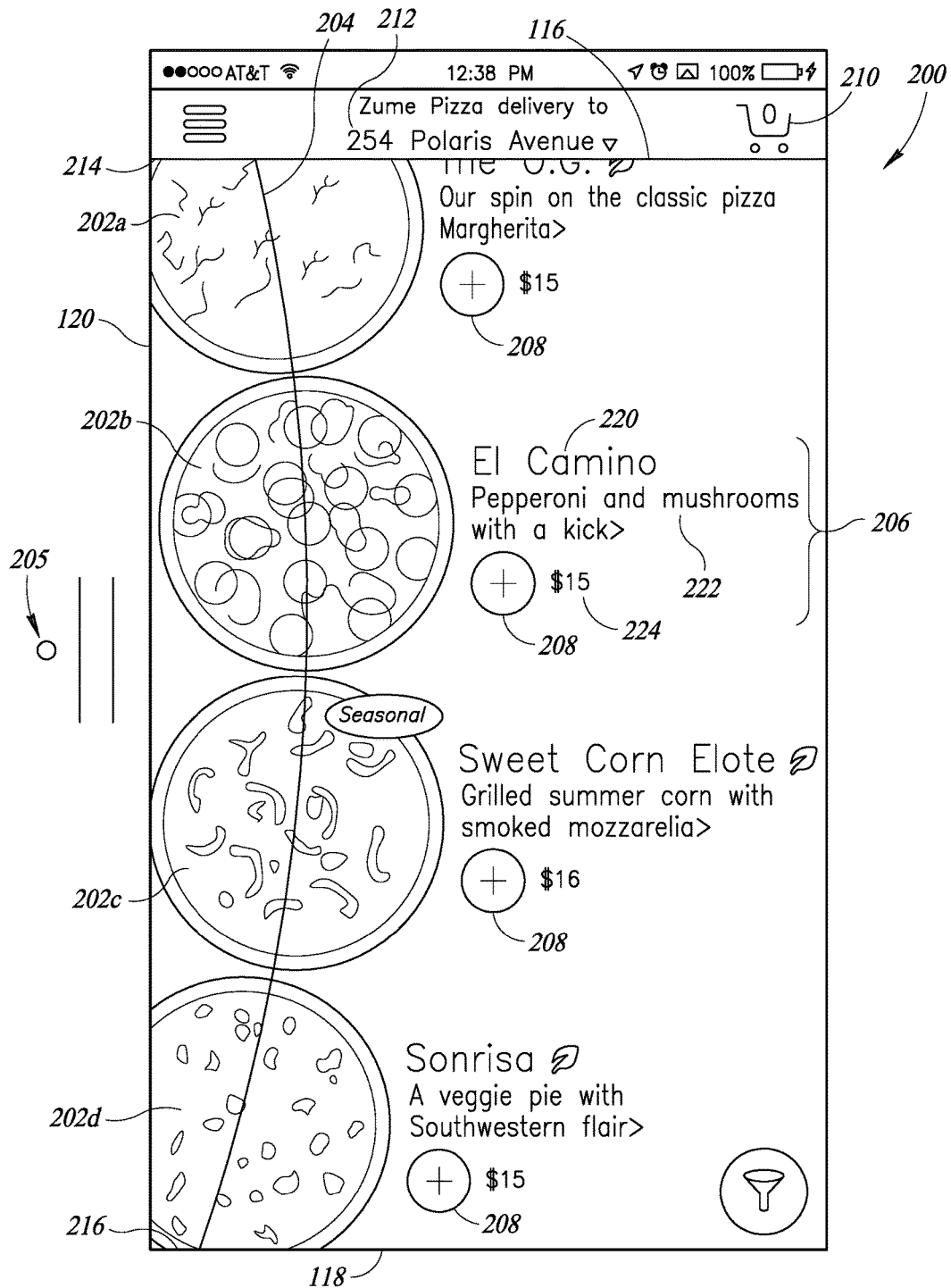
FIG. 2 illustrates a graphical user interface that displays a set of user-selectable item icons along an arc, according to at least one illustrated embodiment.

FIG. 2 illustrates a graphical user interface 200 that is used to display a set of user-selectable item icons 202*a*-202*d* along an arc 204, according to at least one illustrated embodiment.

The user-selectable item icons 202*a*-202*d* displayed in graphical user interface 200 include images of multiple types of pizza offered for purchase and delivery by the merchant. The arc 204 may be defined by a virtual point 205 that is located off of the touchscreen display 114. In addition, the arc 204 may be arranged so that it passes approximately through two corners (e.g., first corner 214 and second corner 216) of the touchscreen display 114. The first corner 214 is defined by the intersection of the top edge 116 of the touchscreen display 114 and the first side edge 120 of the touchscreen display. The second corner 216 is defined by the intersection of the bottom edge 118 of the touchscreen display 114 and the first side edge 120 of the touchscreen display 114. Each of the user-selectable item icons 202*a*-202*d* is angularly arrayed to appear at equally spaced intervals along the arc 204. Alternatively, the user-selectable item icons 202*a*-202*d* can be angularly arrayed to appear at unequally spaced intervals along the arc 204.

Optionally, the user-selectable item icons 202 are arranged to overlap, thus allowing for additional user-selectable item icons 202 to be presented by the graphical user interface 200. The overlapping may be accomplished, for example, by having a portion of the top of a first user-selectable item icon 202 cover a portion of the bottom of a second user-selectable item icon 202 that is placed on the arc 204 immediately above the first user-selectable item icon 202. Further a portion of the top of the second user-selectable item icon 202 may be positioned to cover a portion of the bottom of a third user-selectable item icon 202 that is placed on the arc 204 immediately above the second user-selectable item icon 202. This arrangement may continue for each of the user-selectable item icons 202 displayed using the graphical user interface 200.

Importantly, the total number of user selectable icons 202 that can possibly be displayed via scrolling can be unlimited. For example, the total number that are displayable via scrolling can far exceed the total number that could be arrayed around a closed path defined by the arc or locus of points were the arc or locus of points extended beyond the confines of the screen about the virtual point(s). For instance, a large set of user selectable icons 202 can be stored in memory, for example in a linear array or linked list, and subsets selected for display along the arc about some currently centrally displayed one of the user selectable icons 202. Again, the total number of user selectable icons 202 stored in memory can exceed by one, or more (e.g., 10×) the total number of icons that could be array around the arc or locus of points if the arc of locus of points formed a closed path (e.g., closed circle, closed ellipse) that extended beyond the edges of the screen.

The graphical user interface 200 shown in FIG. 2 includes additional information. For example, the graphical user interface is used to present a set of additional information 206 about each of the items being offered for sale. The set of additional information 206 includes various elements, such as the name of the item being presented on the screen 220, a short textual description of the item 222, and the item's price 224. As shown in FIG. 2, the set of additional information 206 is located alongside the user-selectable item icon 202 of the associated pizza. The set of additional information 206 may further be angularly arrayed to occur at equally spaced intervals along the arc 204 that correspond to the intervals occupied by the associated user selectable item icons 202. The elements 220-224 within the set of additional information 206 maintain the same orientation relative to the touchscreen display 114 as the elements 206*a*-206*c* are angularly displaced around the arc 204. Optionally, the set of additional information 206 is part of the associated user selectable item icon 202. In this implementation, selecting any element 220-224 in the set of additional information 206 results in the same action occurring as selecting the associated user selectable item icon 202, as discussed below.

The graphical user interface 200 includes a user-selectable add icon 208 associated with and located alongside each user-selectable item icons 202*a*-202*d*. Each of the user-selectable item icons 202*a*-202*d* presented using the graphical user interface 200 has an associated user-selectable add icon 208. The selection of the user-selectable add icon 208 results in incrementing a number of the associated item in an order list. The overall number of items in the order list is represented by a number positioned within a shopping cart 210. In addition, the graphical user interface 200 can be used to present a delivery address 212 associated with the items on the order list. Optionally, an estimated time for delivery may be presented using the graphical user interface. The estimated time for delivery may be based on the delivery address 212 associated with the current order list. The estimated time for delivery may be based on the items in the current order list.

Selections and other input may be received using a touchscreen display 114. Input may include a tap to the touchscreen display 114 to indicate a selection of one or more of the items on the screen, and a swipe to the touchscreen display 114 to indicate a movement, re-positioning, or scrolling of the user-selectable item icons 202 and other items being displayed on the touchscreen display 114. Items presented using the graphical user interface 200 can be selected by tapping the item as presented on the touchscreen display 114. For example, as will be discussed in more detail below, tapping a user-selectable item icon 202, which is presented as a picture of a pizza, results in additional information being presented on the touchscreen display 114 for the selected pizza. Tapping the user-selectable add icon 208, as discussed above, results in incrementing a number of the associated item in an order list.

Input received by the touchscreen display 114 may be in the form of a swipe in which a user quickly moves one or more fingers across a touch screen device or a track pad to indicate a desired movement of the items on the screen. Referring to FIG. 2, a user may swipe the touchscreen display 114 in an upward direction going from a bottom edge 118 of the touchscreen display 114 to a top edge 116 of the touchscreen display 114 that results in a scroll input in an upward direction being recognized. The scroll input in the upward direction results in the user-selectable item icons 202 scrolling in a direction towards the top edge 116 of the touchscreen display 114. Likewise, a user may swipe the touchscreen display 114 in a downward direction going from the top edge 116 to the bottom edge 118 that results in a scroll input in a downward direction being recognized. The scroll input in the downward direction results in the user-selectable item icons 202 scrolling in a downwards direction from the top edge 116 of the touchscreen display 114 towards the bottom edge 118 of the touchscreen display 114.

The scroll input may also contain one or more values related to the velocity of the swipe by the user. This velocity value associated with the scroll input can be used to control the rate of scrolling for the items being displayed along the arc 204. Accordingly, a relatively fast swipe by the user across the touchscreen display 114 at a relatively high velocity results in the user-selectable item icons 202 being quickly scrolled across the screen along the arc 204 in the corresponding direction. The scrolling of the user-selectable item icons 202 along the arc 204 may continue after the user's finger no longer contacts the touchscreen display 114. By contrast, a slow swipe by the user across the touchscreen display 114 at a relatively low velocity results in the user-selectable item icons 202 scrolling slowly across the screen. The velocity value may also be used to determine a distance of the scroll, which is used to determine how many user-selectable item icons 202 may appear on the touchscreen display 114 before the scroll ends. Optionally, a deceleration value or constant may be used to slow and eventually stop the user-selectable item icons 202 from scrolling across the screen such that the distance of the scroll will be a function of the velocity value and the deceleration value. In some implementations, a user may stop a scroll by pressing and holding a location on the touchscreen display 114. A user may alternatively continue an exiting scroll of the user-selectable item icons 202 along the arc 204 by swiping the touchscreen display 114 in substantially the same direction that the user-selectable item icons 202 are scrolling.

Figure 3:
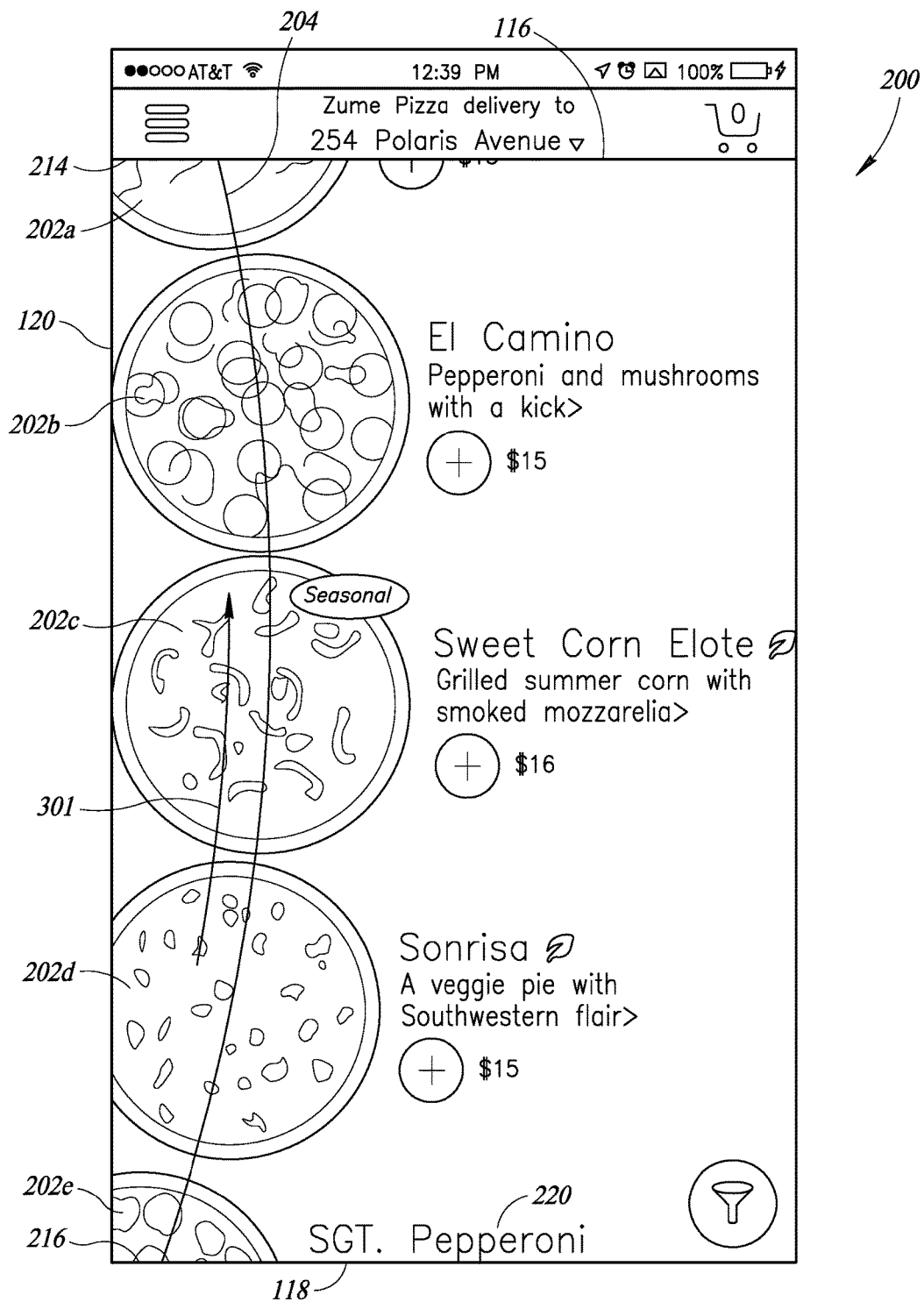
FIG. 3 illustrates the graphical user interface from FIG. 2 in which the user-selectable item icons have moved along the arc in a first direction in response to detecting a swipe in a first direction, according to at least one illustrated embodiment.

FIG. 3 illustrates the graphical user interface 200 from FIG. 2 in which the user-selectable item icons 202 have moved along the arc 204 in an upward direction 301 in response to receiving a scroll input in the upward direction, according to at least one illustrated embodiment.

The movement has resulted in user-selectable item icons 202a-202d being displaced along the arc 204. The movement and displacement of the items displayed on the touchscreen display 114 may be accomplished by rendering iterative presentations in which each of the items is upwardly displaced by a small angular distance along the arc 204 between each presentation. By quickly rendering each iterative presentation, the touchscreen display 114 renders the user-selectable item icons 202 at a plurality of successive angular positions, resulting in motion that can appear to be smooth as viewed by a human, such as might occur if the user-selectable item icons 202 were spinning on a disc or a wheel, such as a "lazy Susan." The amount of angularly displacement between each iterative presentation may be based on the velocity value of the scroll input. A relatively higher velocity value results in a relatively greater angular displacement of the user-selectable item icons 202 between successive iterative presentations to provide the appearance of faster rotation of the user-selectable item icons 202. A relatively lower velocity value results in a relatively lower angular displacement of the user-selectable item icons 202 between successive iterative presentations to provide the appearance of a slower rotation of the user-selectable item icons 202.

In some implementations, the iterative presentations may also be used to present rotation of each individual user-selectable item icon 202. For example, if the set of user-selectable item icon 202 is rotated in one direction (e.g., counter-clockwise), then each user-selectable item icon 202 may individually rotate in the opposite direction (e.g., clockwise). The rate of rotation of each user-selectable item icon 202 may be based on the scroll input and the velocity value that controls the movement of the set of user-selectable item icons 202 along the arc 204.

The movement illustrated in FIG. 3 has resulted in at least a portion an additional fifth user-selectable item icon 202e appearing on the touchscreen display 114. The fifth user-selectable item icon 202e is angularly arrayed to occupy an interval along the arc 204 immediately below the fourth user-selectable item icon 202d. The fifth user-selectable item icon 202e is associated with a set of additional information 206 that includes the name of the item being presented on the screen 220. Additional information, such as the item's short textual description 222 and the item's price 224, is located off screen and is not currently displayed by the touchscreen display 114. The set of additional information 206 is located alongside the fifth user-selectable item icon 202e of the associated pizza.

The upward displacement of the user-selectable item icons 202a-202d has resulted in a decreasing portion of the user-selectable item icon 202a being rendered on the touchscreen display 114 as the first user-selectable item icon 202a is displaced along the arc 204 towards the first corner 214 past the top edge 116 and the first side edge 120 of the touchscreen display 114. Accordingly, each iteration of an upward movement of user-selectable item icons 202 results in a decreasing portion of the first user-selectable item icon 202a being rendered on the touchscreen display 114. At the same time, a progressively increasing portion of the fifth user-selectable item icon 202e appears on the touchscreen display 114 from the second corner 216 with each successive iteration as the fifth user-selectable item icon 202e moves upward along the arc 204.

Figure 4:
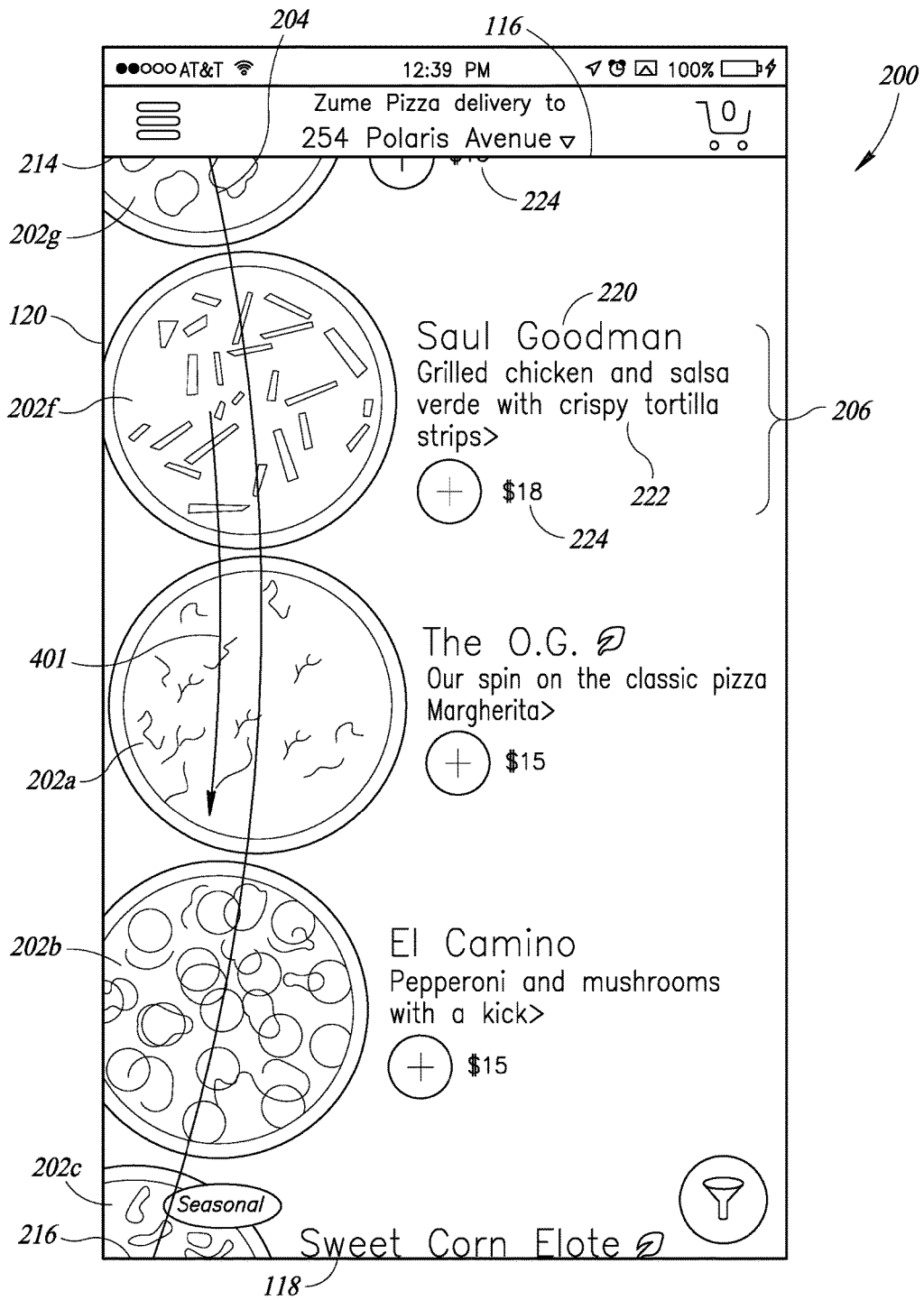
FIG. 4 illustrates the graphical user interface from FIG. 2 in which the user-selectable item icons have moved along the arc in a second direction in response to detecting a swipe in a second direction, according to at least one illustrated embodiment.

FIG. 4 illustrates the graphical user interface 200 from FIG. 2 in which the user-selectable item icons 202 have moved along the arc 204 in an downward direction 401 in response to receiving a scroll input in the downward direction, according to at least one illustrated embodiment.

The movement has resulted in user-selectable item icons 202a-202d being displaced along the arc 204. The movement and displacement of the items displayed on the touchscreen display 114 may be accomplished by rendering iterative presentations in which each of the items is downwardly displaced by a small angular distance along the arc 204 between each presentation. By quickly rendering each iterative presentation, the touchscreen display 114 renders the user-selectable item icons 202 at a plurality of successive angular positions, resulting in motion that can appear to be smooth, such as might occur if the user-selectable item icons 202 were spinning on a disc or a wheel, such as a lazy Susan. The amount of angularly displacement between each iterative presentation may be based on the velocity value of the scroll input. A relatively higher velocity value results in a relatively greater angular displacement of the user-selectable item icons 202 between successive iterative presentations to provide the appearance of faster rotation of the user-selectable item icons 202. A relatively lower velocity value results in a relatively lower angular displacement of the user-selectable item icons 202 between successive iterative presentations to provide the appearance of a slower rotation of the user-selectable item icons 202. The velocity value may also be used to determine a distance of the scroll, which is used to determine how many user-selectable item icons 202 may appear on the touchscreen display 114 before the scroll ends. Optionally, a deceleration value or constant may be used to slow and eventually stop the user-selectable item icons 202 from scrolling across the screen such that the distance of the scroll will be a function of the velocity value and the deceleration value.

The movement illustrated in FIG. 4 has resulted in an additional sixth user-selectable item icon 202f and a portion of an additional seventh user-selectable item icon 202g appearing on the touchscreen display 114. The sixth user-selectable item icon 202f is angularly arrayed to occupy an interval along the arc 204 immediately above the first user-selectable item icon 202a. The seventh user-selectable item icon 202g is angularly arrayed to occupy an interval along the arc 204 immediately above the sixth user-selectable item icon 202f. The sixth user-selectable item icon 202f is associated with a set of additional information 206 that includes the item's name 220, the item's short textual description 222, and the item's price 224. The set of additional information 206 is located alongside the sixth user-selectable item icon 202f of the associated pizza. The seventh user-selectable item icon 202g is associated with a set of additional information 206 that includes the item's price 224. Additional information, such as the item's name 220 and the item's short textual description 222, is located off screen and is not currently rendered on the touchscreen display 114. The set of additional information 206 is located alongside the seventh user-selectable item icon 202g of the associated pizza.

The downward displacement of the user-selectable item icons 202a-202d has resulted in the fourth user-selectable item icon 202d being removed from the touchscreen display 114 as the fourth user-selectable item icon 202d has moved along the arc 204 towards the second corner 216 and continued past the bottom edge 118 and the first side edge 120 of the touchscreen display 114. In addition, a decreasing portion of the third user-selectable item icon 202c is rendered on the touchscreen display 114 as the third user-selectable item icon 202c is displaced along the arc 204 towards the second corner 216. A portion of the third user-selectable item icon 202c has continued past the bottom edge 118 and the first side edge 120 and is no longer visible on the touchscreen display 114. Accordingly, each iteration of a downward movement of the user-selectable item icons 202 results in a decreasing portion of the third user-selectable item icon 202c being rendered on the touchscreen display 114. At the same time, a progressively increasing portion of the seventh user-selectable item icon 202g appears on the touchscreen display 114 from first corner 214 with each successive iteration as the seventh user-selectable item icon 202g moves downward along the arc 204.

Figure 5:
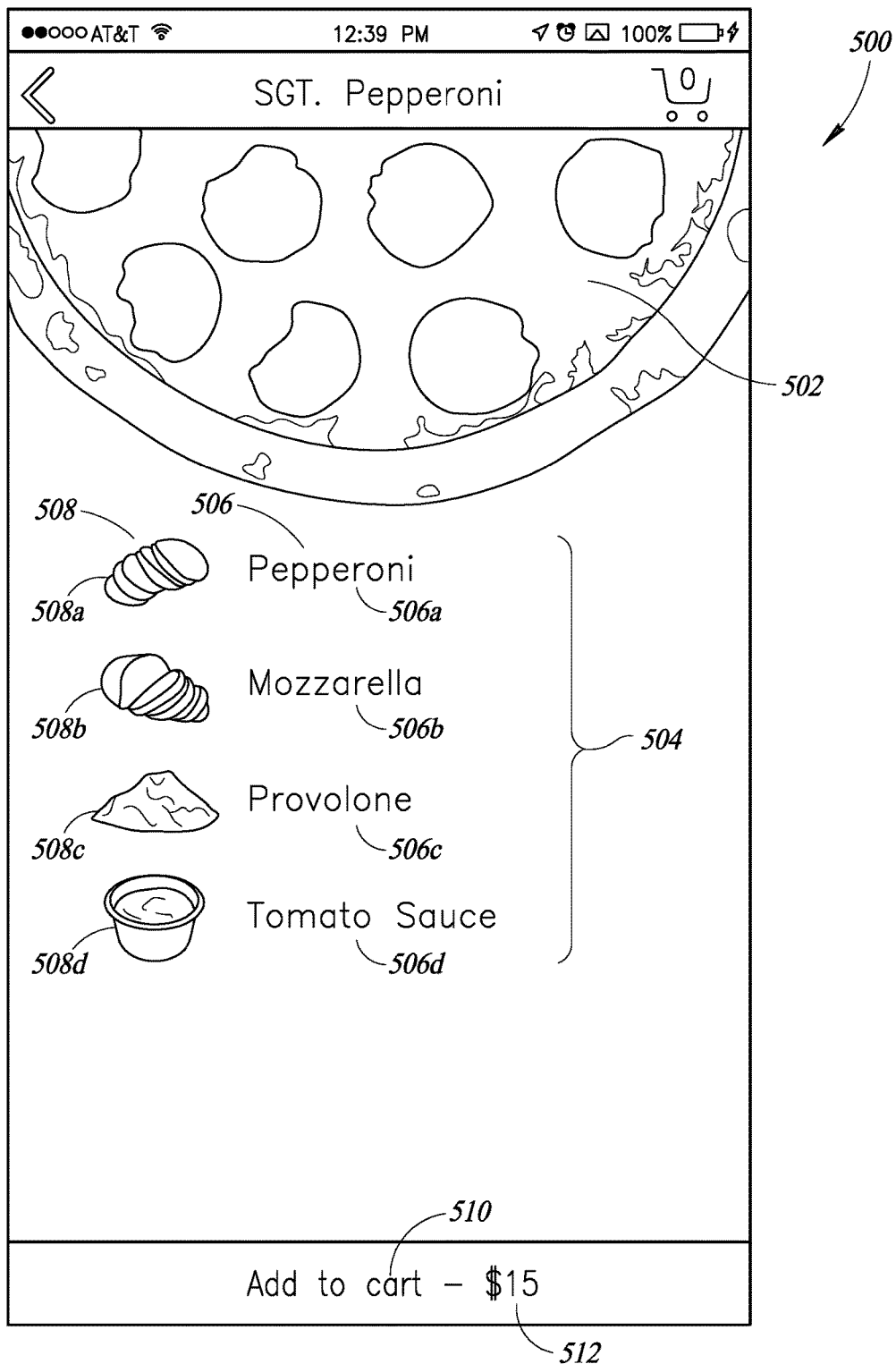
FIG. 5 illustrates a graphical user interface in the form of an item information screen that provides a close-up image of a portion of a user-selectable item icons along with additional information associated with the user-selectable item icon, according to at least one illustrated embodiment.

FIG. 5 illustrates a graphical user interface 200 that is in the form of an item information display 500 that provides a close-up image 502 of a portion of a user-selectable item icon along with additional information 504 associated with the user-selectable item icon, according to at least one illustrated embodiment.

A user can navigate to the item information display 500 by selecting or tapping on one of user-selectable item icons 202. The item information display 500 includes the close up image 502 of the selected item. As shown in FIG. 5, the close up image 502 is a close up of a Sgt. Pepperoni Pizza.

The item information display 500 may further include additional information 504 associated with the selected item. The additional information 504 may include a list of ingredients 506 for the selected item. The list of ingredients 506 may further include graphic representations 508 for the listed ingredients. As shown in FIG. 5, the list of ingredients 506 for the Sgt. Pepperoni includes pepperoni 506a, mozzarella 506b, provolone 506c, and tomato sauce 506d. Each of the ingredients 506a-506d has associated with it a graphic representation 508 of the ingredient. The graphic representations 508 include a picture of a stack of pepperoni 508a associated with pepperoni 506a; a picture of slices of mozzarella 508b associated with mozzarella 506b; a picture of shredded provolone 508c associated with provolone 506c; and a picture of a cup of tomato sauce 508d associated with tomato sauce 506d.

The item information display 500 may include a user-selectable add icon 510. In some implementations, the user-selectable add icon 510 also lists the price 512 of the selected item. The user can select the user-selectable add icon 510 by tapping on the icon 510 as rendered on the touchscreen display 114. The selection of the user-selectable add icon 510 results in a number of the selected item being incremented on the order list. The overall number of items in the order list is represented by a number positioned within a shopping cart 510.

Figure 6:
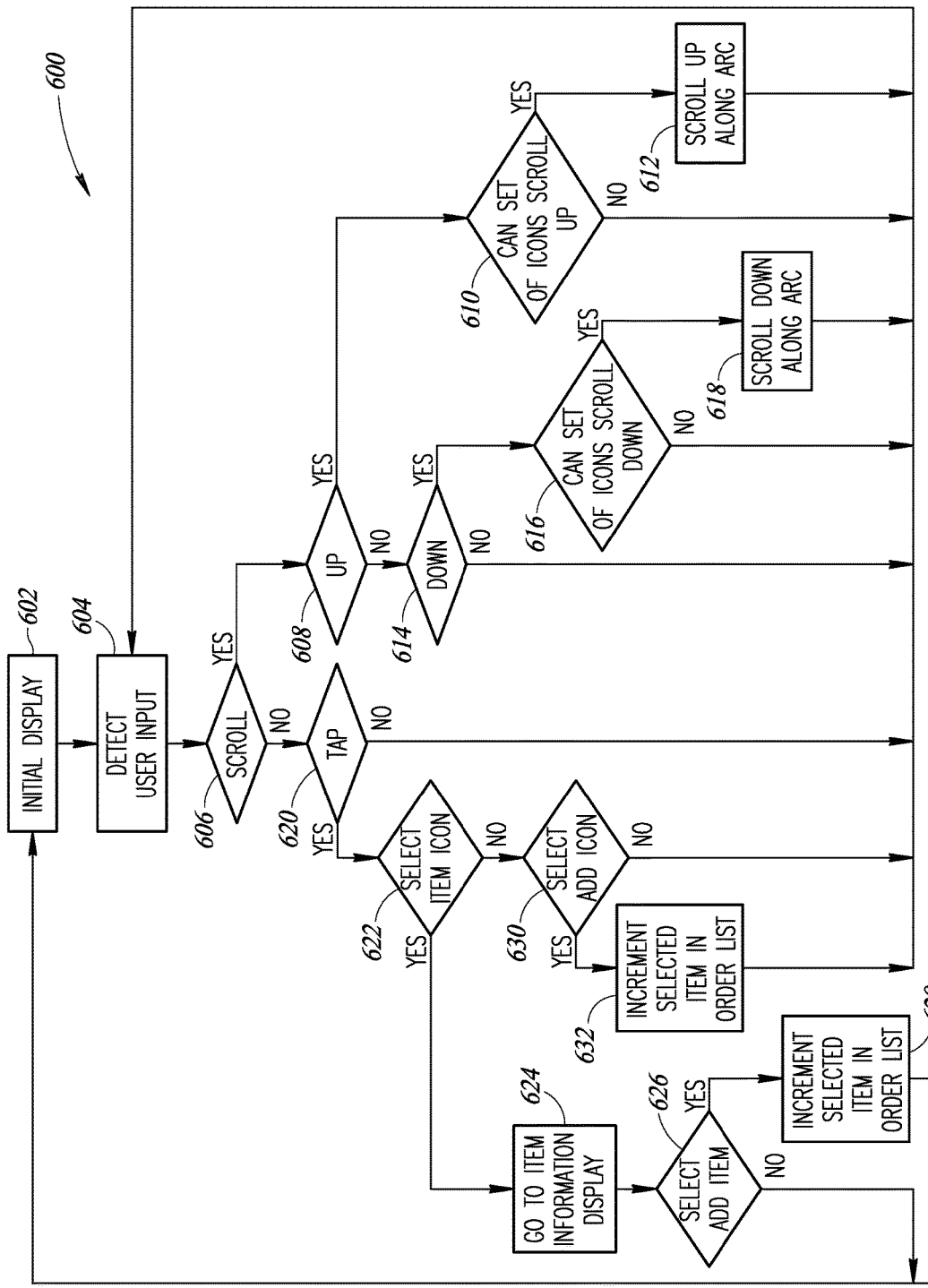
FIG. 6 is a logic flow diagram showing an example method for displaying at least some of a set of user-selectable item icons and allowing a selection of at least one of the user-selectable item icons, according to at least one illustrated embodiment.

FIG. 6 is a logic flow diagram showing an example method 600 for displaying at least some of a set of user-selectable item icons 202 and allowing a selection of at least one of the user-selectable item icons 202, according to at least one illustrated embodiment.

The method 600 begins at 602 in which an initial display of a subset of user-selectable item icons 202 are rendered on a touchscreen display 114. The initial display may further include information related to the delivery address currently selected and an estimated time of delivery.

At 604, the method 600 waits to detect an input. The input may be in the form of a scroll input in which a user has swiped one or more fingers across the touchscreen display 114. The input may be in the form of a selection in which the user has tapped a portion of the touchscreen display 114. The current image being rendered on the touchscreen display 114 is maintained until an input is detected.

At 606, a determination is made if the input consists of a scroll input. If scroll input is received, then the method 600 continues to 608 to determine if the scroll input is in the up direction. If a scroll input is not received, the method 600 proceeds to 620 to determine if the input is a selection or tap input.

At 608, a determination is made if a scroll input is in the up direction. If so, then the method 600 proceeds to 610. If it is determined that the scroll input is not in the up direction, then the method 600 proceeds to 614 to determine if the scroll input is in the down direction.

At 610, a determination is made if the display of the subset of user-selectable item icons 202 can be moved upwards. In some implementations the set of user-selectable item icons 202 may have a user-selectable item icon 202 that defines a beginning of the set. When the user-selectable item icon 202 that defines the beginning of the set is at the top edge 116 of the touchscreen display 114, then the set of user-selectable item icons 202 may not be scrollable in the upward direction. If the set of user-selectable item icons 202 is scrollable in the upward direction, then the method 600 proceeds to 612. If the set of user-selectable item icons 202 is not scrollable in the upward direction, then the method 600 returns to 604 await additional input.

At 612, a velocity value of an upward scrolling motion is determined. In some implementations, the velocity value is based on the velocity of a user's swipe across the touchscreen display 114. The velocity value is used to determine the change in angular positions for each of the user-selectable item icons 202 between each successive iterative presentation that is rendered on the touchscreen display 114. By quickly rendering each iterative presentation, the touchscreen display 114 renders the user-selectable item icons 202 at a plurality of successive angular positions, resulting in motion that can appear to be smooth as perceived by a human, such as might occur if the user-selectable item icons 202 were spinning on a disc or a wheel, such as a "lazy Susan." The velocity value may also be used to determine a distance of the scroll, which is used to determine how many user-selectable item icons 202 may appear on the touchscreen display 114 before the scroll ends. Optionally, a deceleration value or constant may be used to slow and eventually stop the user-selectable item icons 202 from scrolling across the screen such that the distance of the scroll will be a function of the velocity value and the deceleration value. The set of user-selectable item icons 202 is then scrolled accordingly on the touchscreen display 114. After the scrolling motion is complete, the method 600 returns to 604 to await further input.

At 614, a determination is made if a scroll input is in the down direction. If so, then the method 600 proceeds to 616. If it is determined that the scroll input is not in the down direction, then the method 600 proceeds to 604 await further input.

At 616, a determination is made if the display of the subset of user-selectable item icons 202 can be moved downwards. In some implementations the set of user-selectable item icons 202 may have a user-selectable item icon 202 that defines an end of the set. When the user-selectable item icon 202 that defines the end of the set is at the bottom edge 118 of the touchscreen display 114, then the set of user-selectable item icons 202 may not be scrollable in the downward direction. If the set of user-selectable item icons 202 is scrollable in the downward direction, then the method 600 proceeds to 618. If the set of user-selectable item icons 202 is not scrollable in the upward direction, then the method 600 returns to 604 await additional input.

At 618, the angular velocity of a downward scrolling motion is determined. In some implementations, the velocity value is based on the velocity of a user's swipe across the touchscreen display 114. The velocity value is used to determine the change in angular positions for each of the user-selectable item icons 202 between each successive iterative presentation that is rendered on the touchscreen display 114. By quickly rendering each iterative presentation, the touchscreen display 114 renders the user-selectable item icons 202 at a plurality of successive angular positions, resulting in motion that can appear to be smooth as perceived by a human, such as might occur if the user-selectable item icons 202 were spinning on a disc or a wheel, such as a "lazy Susan." The velocity value may also be used to determine a distance of the scroll, which is used to determine how many user-selectable item icons 202 may appear on the touchscreen display 114 before the scroll ends. Optionally, a deceleration value or constant may be used to slow and eventually stop the user-selectable item icons 202 from scrolling across the screen such that the distance of the scroll will be a function of the velocity value and the deceleration value. The set of user-selectable item icons 202 is then scrolled accordingly on the touchscreen display 114. After the scrolling motion is complete, the method 600 returns to 604 to await further user input.

At 620, a determination is made if the input is a tap or selection input. If so, the method 600 continues to 622. If the input is not a tap or a selection input, then the method 600 returns to 604 to await further input.

At 622, a determination is made if the selection input is associated with a user-selectable item icon 202. The selection input can be associated with a user-selectable item icon 202 when, for example, the user taps or selects the touchscreen display 114 at a location at which the user-selectable item icon 202 is displayed. If the selection input is associated with a user-selectable item icon, then the method 600 goes to the item information display at 624. If the selection input is not associated with a user-selectable item icon 202, then the method 600 proceeds to 630.

At 624, the item information display 500 is rendered on the touchscreen display 114. The item information display provides a close-up image 502 of a portion of a user-selectable item icon along with additional information 504 associated with the user-selectable item icon, according to at least one illustrated embodiment. The item information display is maintained on the touchscreen display 114 until further input is received. When a selection input is received, the method 600 proceeds to 626.

At 626, a determination is made whether the selection input is associated with the user-selectable add icon 208 on the item information display. The selection input can be associated with a user-selectable add icon 208 when, for example, the user taps or selects the touchscreen display 114 at a location at which the user-selectable add icon 208 is displayed. If the selection input is associated with a user-selectable add icon 208, then the method 600 proceeds to 628. If the selection input is not associated with a user-selectable add icon 208, then the method 600 returns to 602 to provide an initial display of a set of user-selectable item icons 202.

At 628, a number of the item associated with a user-selectable add icon 208 in an order list is incremented. The method 600 then proceeds to 602 to present the initial display and await further input.

At 630, a determination is made whether the selection input is associated with a user-selectable add icon 208 displayed alongside a user-selectable item icon 202. If so, then the method 600 proceeds to 632. If the selection input is not associated with a user-selectable add icon 208 displayed alongside a user-selectable item icon 202, then the method 600 proceeds to 604 to await additional input.

At 632, a number of the item associated with a user-selectable add icon 208 in an order list is incremented. The method 600 then proceeds to 604 to await further input.

The above description of illustrated embodiments and implementation, including what is described in the Abstract, is not intended to be exhaustive or to limit the embodiments or implementations to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to cutting various types of food items, not necessarily the exemplary cutting of pizza generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/394,063, filed Sep. 13, 2016, entitled "CUTTER WITH RADIALLY DISPOSED BLADES"; U.S. Pat. No. 9,292,889, issued Mar. 22, 2016, entitled "SYSTEMS AND METHODS OF PREPARING FOOD PRODUCTS"; U.S. patent application Ser. No. 15/040,866, filed Feb. 10, 2016, entitled "SYSTEMS AND METHODS OF PREPARING FOOD PRODUCTS"; U.S. Provisional Patent Application No. 62/311,787, filed Mar. 22, 2016, entitled "CONTAINER FOR TRANSPORT AND STORAGE OF FOOD PRODUCTS"; U.S. Provisional Patent Application No. 62/620,282, filed Aug. 8, 2016, entitled "ON-DEMAND ROBOTIC FOOD ASSEMBLY AND RELATED SYSTEMS, DEVICES AND METHODS"; U.S. Design patent application Ser. No. 29/558,874, filed Mar. 22, 2016, entitled "FOOD CONTAINER"; U.S. Design patent application Ser. No. 29/558,873, filed Mar. 22, 2016, entitled "FOOD CONTAINER COVER"; U.S. Design patent application Ser. No. 29/558,872, filed Mar. 22, 2016, entitled "FOOD CONTAINER BASE"; U.S. Design patent application Ser. No. 29/574,802, filed Aug. 18, 2016, entitled "FOOD CONTAINER"; U.S. Design patent application Ser. No. 29/574,805, filed Aug. 18, 2016, entitled "FOOD CONTAINER COVER"; U.S. Design patent application Ser. No. 29/574,808, filed Aug. 18, 2016, entitled "FOOD CONTAINER BASE"; Hong Kong Patent Application No. 16103287.8, filed Mar. 21, 2016, entitled "SYSTEMS AND METHODS FOR PREPARING FOOD PRODUCTS"; European Patent Application No. EP14814044.5, filed Nov. 9, 2015, entitled "SYSTEMS AND METHODS FOR PREPARING FOOD PRODUCTS"; and PCT Application No. PCT/US2014/042879, filed Jun. 18, 2014, entitled "SYSTEMS AND METHODS FOR PREPARING FOOD PRODUCTS" are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a device to display at least some of a set of user-selectable item icons, the method comprising:
  initially causing a presentation of a first subset of the set of user-selectable item icons on a screen, in which a plurality of the user-selectable item icons comprising the first subset are angularly arrayed along an arc, wherein the arc is defined as curving about at least one virtual point located off the screen;
  in response to a first scroll input,
    causing a series of iterative presentations of the user-selectable item icons comprising the first subset in which the user-selectable item icons comprising the first subset are presented at a plurality of viewable successive item-icon positions along the arc angularly movable in a first direction along the arc; and
  as one of the user-selectable item icons that is part of the first subset moves angularly past a second end of the arc, causing a presentation proximate a first end of the arc of at least a portion of a user-selectable item icon of the set of user-selectable item icons that was not part of the first subset of the set of user-selectable item icons;
  wherein the set of user-selectable item icons has a quantity of item icons that exceeds a sum of (a) a first quantity of the plurality of viewable successive item-icon positions along the arc and (b) a second quantity of a non-viewable virtual plurality of successive item-icon positions of a virtual extension of the arc defined as curving, off the screen, about the at least one virtual point, between the first and the second ends of the arc.

2. The method of claim 1 wherein causing a series of iterative presentations of the user-selectable item icons includes causing the series of iterative presentations of the user-selectable item icons in which the plurality of viewable successive item-icon positions are angularly arrayed at equally spaced intervals along the arc.

3. The method of claim 1, further comprising:
  detecting a first swipe as the first scroll input, the first swipe extending predominately in the first direction along the arc;
  in response to the first scroll input,
    causing a series of iterative presentations of the user-selectable item icons comprising a second subset in which the user-selectable item icons comprising the second subset are presented at a plurality of viewable successive item-icon positions along the arc angularly movable along the arc; and
  as one of the user-selectable item icons that is part of the second subset is moved past one end of the arc, causing a presentation proximate another end of the arc of at least a portion of a user-selectable item icon of the set of user-selectable item icons that was not part of the second subset.

4. The method of claim 3 where the screen has a first edge and at least a second edge, the second edge opposed to the first edge, and wherein causing a presentation proximate a first end of the arc of at least a portion of a user-selectable item icon of the set of user-selectable item icons that was not part of the first subset includes causing the presentation to iteratively present a progressively increasing portion of the user-selectable item icon that was not part of the first subset entering the screen along the first edge thereof.

5. The method of claim 3 wherein causing a presentation proximate another end of the arc of at least a portion of a user-selectable item icon of the set of user-selectable item icons that was not part of the second subset includes causing the presentation to iteratively present a progressively decreasing portion of the user-selectable item icon that was not part of the first subset exiting the screen along the first edge thereof.

6. The method of claim 3 where the screen has a first edge, a second edge, a third edge, and a fourth edge, a first corner where the first edge intersects the third edge and a second corner where the second edge intersects the third edge, and wherein causing a presentation proximate a first end of the arc of at least a portion of a user-selectable item icon of the set of user-selectable item icons that was not part of the first subset includes causing the presentation to iteratively present a progressively increasing portion of the user-selectable item icon that was not part of the first subset entering the screen at the first corner.

7. The method of claim 6 wherein causing a presentation proximate another end of the arc of at least a portion of a user-selectable item icon of the set of user-selectable item icons that was not part of the second subset includes causing the presentation to iteratively present a progressively decreasing portion of the user-selectable item icon that was not part of the first subset exiting the screen at the second corner.

8. The method of claim 3, further comprising:
  detecting a second swipe that extends predominately in the first direction along the arc as the second scroll input.

9. The method of claim 3, further comprising:
  detecting a second swipe that extends predominately in a second direction along the arc as the second scroll input, the second direction opposed to the first direction.

10. The method of claim 1 wherein causing iterative presentations of the user-selectable item icons includes causing iterative presentations of respective images of respective items the images which can be selected via an input.

11. The method of claim 10, further comprising;
  in response to a selection of one of the user-selectable item icons, presenting a close up image of a portion of the respective item, along with a set of ingredients that comprise the respective item.

12. The method of claim 10, further comprising;
  in response to a selection of one of the user-selectable item icons, presenting a close up image of a portion of the respective item, along with a set of names and a graphic representation of each of a plurality of ingredients that comprise the respective item, a user-selectable add icon along with in indication of a price of the respective icon; and
  in response to a selection of the user-selectable add icon, incrementing a number of the respective items in an order list.

13. The method of claim 1 wherein causing a series of iterative presentations of the user-selectable item icons comprising the first subset includes causing the iterative presentations of respective images of respective items each with a fixed orientation relative to the screen, the orientation of each of the images relative to the screen being the same at each of the viewable successive item-icon positions angularly movable along the arc.

14. The method of claim 1, further comprising:
causing a presentation of a number of user-selectable add icons angularly arrayed with one another, each user-selectable add icon presented alongside a respective one of the user-selectable item icons at each iterative position at which the user-selectable item icon is presented.

15. The method of claim 14, further comprising:
in response to a selection of one of the user-selectable add icons, incrementing a number of the respective items in an order list.

16. The method of claim 1, further comprising:
causing a presentation of a number of item names angularly arrayed with one another, each item name presented alongside a respective one of the user-selectable item icons at each viewable successive item-icon position at which the user-selectable item icon is movably presented.

17. The method of claim 16 wherein causing a presentation of a number of item names angularly arrayed with one another includes causing the presentation of the number of item names at each of the viewable successive item-icon positions along the arc where each of the items names has a fixed orientation relative to the screen, the orientation of each of the item names relative to the screen being the same at each of the viewable successive item-icon position along the arc.

18. The method of claim 1, further comprising:
causing a presentation of a number of textual descriptions angularly arrayed with one another, each textual description presented alongside a respective one of the user-selectable item icons at each iterative position at which the user-selectable item icon is presented, including causing the presentation of the number of textual descriptions at each of the viewable successive item-icon positions along the arc where each of the textual descriptions has a fixed orientation relative to the screen, the orientation of each of the textual descriptions relative to the screen being the same at each of the viewable successive item-icon positions along the arc.

19. The method of claim 1, further comprising:
causing a presentation of a number of item prices angularly arrayed with one another, each item price presented alongside a respective one of the user-selectable item icons at each viewable successive item-icon position at which the user-selectable item icon is presented.

20. The method of claim 19 wherein causing a presentation of a number of item prices angularly arrayed with one another includes causing the presentation of the number of item prices at each of the viewable successive item-icon positions along the arc where each of the items prices has a fixed orientation relative to the screen, the orientation of each of the item prices relative to the screen being the same at each of the viewable successive item-icon positions along the arc.

21. The method of claim 1, further comprising:
causing a presentation of a menu of user selectable delivery locations.

22. A device to display at least some of a set of user-selectable item icons, the device comprising:
a screen;
circuitry including at least one processor communicatively coupled to the screen;
at least one nontransitory processor-readable medium communicatively coupled to the at least one processor and that stores at least one of processor- executable instructions or data which, when executed by the at least one processor, causes the at least one processor to:
initially cause a presentation of a first subset of the set of user-selectable item icons on a screen, in which a plurality of the user-selectable item icons comprising the first subset are angularly arrayed along an arc, wherein the arc is defined as curving about at least one virtual point located off the screen;
in response to a first scroll input,
cause a series of iterative presentations of the user-selectable item icons comprising the first subset in which the user-selectable item icons comprising the first subset are presented at a plurality of viewable successive item-icon positions angularly movable along the arc in a first direction along the arc; and
as one of the user-selectable item icons that is part of the first subset moves angularly past a second end of the arc, cause a presentation proximate a first end of the arc of at least a portion of a user-selectable item icon of the set of user-selectable item icons that was not part of the first subset;
wherein the set of user-selectable item icons has a quantity of item icons that exceeds a sum of (a) a first quantity of the plurality of viewable successive item-icon positions along the arc and (b) a second quantity of a non-viewable virtual plurality of successive item-icon positions of a virtual extension of the arc defined as curving, off the screen, about the at least one virtual point, between the first and the second ends of the arc.

23. The device of claim 22 wherein to cause a series of iterative presentations of the user-selectable item icons comprising the first subset in which the user-selectable item icons comprising the first subset are presented at a plurality of viewable successive item-icon positions along the arc in a first direction along the arc includes to cause the series of iterative presentations of the user-selectable item icons in which the plurality of the user-selectable icons comprising the first subset are angularly arrayed at equally spaced intervals along the arc.

24. The device of claim 22 wherein the executable instructions or data which, when executed by the at least one processor, causes the at least one processor to further:
detect a first swipe as the first scroll input.

25. The device of claim 24 wherein to detect the first swipe includes to detect the first swipe which extends predominately in the first direction along the arc.

26. The device of claim 25 wherein the executable instructions or data which, when executed by the at least one processor, causes the at least one processor to further:
in response to a second scroll input,
cause a series of iterative presentations of the user-selectable item icons comprising a second subset in which the user-selectable item icons comprising the second subset are presented at a plurality of viewable successive item-icon positions along the arc; and
as one of the user-selectable item icons that is part of the second subset iterates angularly past one end of the arc, cause a presentation proximate another end of the arc of at least a portion of a user-selectable item icon of the set of user-selectable item icons that was not part of the second subset.

27. The device of claim 26 where the screen has a first edge and at least a second edge, the second edge opposed to the first edge, and wherein to cause a presentation proximate a first end of the arc of at least a portion of a user-selectable item icon of the set of user-selectable item icons that was not part of the first subset includes to cause the presentation to iteratively present a progressively increasing portion of the user-selectable item icon that was not part of the first subset entering the screen along the first edge thereof.

28. The device of claim 26 wherein to cause a presentation proximate another end of the arc of at least a portion of a user-selectable item icon of the set of user-selectable item icons that was not part of the second subset includes to cause the presentation to iteratively present a progressively decreasing portion of the user-selectable item icon that was not part of the first subset exiting the screen along the first edge thereof.

29. The device of claim 26 where the screen has a first edge, a second edge, a third edge, and a fourth edge, a first corner where the first edge intersects the third edge and a second corner where the second edge intersects the third edge, and wherein to cause a presentation proximate a first end of the arc of at least a portion of a user-selectable item icon of the set of user-selectable item icons that was not part of the first subset includes to cause the presentation to iteratively present a progressively increasing portion of the user-selectable item icon that was not part of the first subset entering the screen at the first corner.

30. The device of claim 29 wherein to cause a presentation proximate another end of the arc of at least a portion of a user-selectable item icon of the set of user-selectable item icons that was not part of the second subset includes to cause the presentation to iteratively present a progressively decreasing portion of the user-selectable item icon that was not part of the first subset exiting the screen at the second corner.

31. The device of claim 26 wherein the executable instructions or data which, when executed by the at least one processor, causes the at least one processor to further:
   detect a second swipe that extends predominately in the first direction along the arc as the second scroll input.

32. The device of claim 26 wherein the executable instructions or data which, when executed by the at least one processor, causes the at least one processor to further:
   detect a second swipe that extends predominately in a second direction along the arc as the second scroll input, the second direction opposed to the first direction.

33. The device of claim 22 wherein to cause iterative presentations of the user-selectable item icons includes to cause iterative presentations of respective images of respective items the images which can be selected via an input.

34. The device of claim 33 wherein the executable instructions or data which, when executed by the at least one processor, causes the at least one processor to further:
   in response to a selection of one of the user-selectable item icons, present a close up image of a portion of respective item.

35. The device of claim 33 wherein the executable instructions or data which, when executed by the at least one processor, causes the at least one processor to further:
   in response to a selection of one of the user-selectable item icons, present a close up image of a portion of the respective item, along with a set of ingredients that comprise the respective item.

36. The device of claim 33 wherein the executable instructions or data which, when executed by the at least one processor, causes the at least one processor to further:
   in response to a selection of one of the user-selectable item icons, present a close up image of a portion of the respective item, along with a set of names and a graphic representation of each of a plurality of ingredients that comprise the respective item.

37. The device of claim 33 wherein the executable instructions or data which, when executed by the at least one processor, causes the at least one processor to further:
   in response to a selection of one of the user-selectable item icons, present a close up image of a portion of the respective item, along with a set of names and a graphic representation of each of a plurality of ingredients that comprise the respective item, and along with a user-selectable add icon, selection of which increments a number of the respective items in an order list.

38. The device of claim 33 wherein the executable instructions or data which, when executed by the at least one processor, causes the at least one processor to further:
   in response to a selection of one of the user-selectable item icons, present a close up image of a portion of the respective item, along with a set of names and a graphic representation of each of a plurality of ingredients that comprise the respective item, a user-selectable add icon along with in indication of a price of the respective icon; and
   in response to a selection of the user-selectable add icon, increment a number of the respective items in an order list.

39. The device of claim 22 wherein to cause a series of iterative presentations of the user-selectable item icons comprising the first subset in which the user-selectable item icons comprising the first subset are presented at a plurality of viewable successive item-icon positions along the arc in a first direction along the arc includes to cause the iterative presentations of respective images of respective items each with a fixed orientation relative to the screen, the orientation of each of the images relative to the screen being the same at each of the viewable successive item-icon positions along the arc.

40. The device of claim 22 wherein the executable instructions or data which, when executed by the at least one processor, causes the at least one processor to further:
   cause a presentation of a number of user-selectable add icons angularly arrayed with one another, each user-selectable add icon presented alongside a respective one of the user-selectable item icons at each iterative position at which the user-selectable item icon is presented.

41. The device of claim 40 wherein the executable instructions or data which, when executed by the at least one processor, causes the at least one processor to further:
   in response to a selection of one of the user-selectable add icons, increment a number of the respective items in an order list.

42. The device of claim 22 wherein the executable instructions or data which, when executed by the at least one processor, causes the at least one processor to further:
   cause a presentation of a number of item names angularly arrayed with one another, each item name presented alongside a respective one of the user-selectable item icons at each viewable successive item-icon position at which the user-selectable item icon is presented.

43. The device of claim 42 wherein to cause a presentation of a number of item names angularly arrayed with one another includes to cause the presentation of the number of item names at each of the viewable successive item-icon positions along the arc where each of the items names has a fixed orientation relative to the screen, the orientation of each of the item names relative to the screen being the same at each of the viewable successive item-icon positions along the arc.

44. The device of claim 22 wherein the executable instructions or data which, when executed by the at least one processor, causes the at least one processor to further:
cause a presentation of a number of textual descriptions angularly arrayed with one another, each textual description presented alongside a respective one of the user-selectable item icons at each iterative position at which the user-selectable item icon is presented.

45. The device of claim 44 wherein to cause a presentation of a number of textual descriptions angularly arrayed with one another includes to cause the presentation of the number of textual descriptions at each of the viewable successive item-icon positions along the arc where each of the textual descriptions has a fixed orientation relative to the screen, the orientation of each of the textual descriptions relative to the screen being the same at each of the viewable successive item-icon angular positions along the arc.

46. The device of claim 22 wherein the executable instructions or data which, when executed by the at least one processor, causes the at least one processor to further:
cause a presentation of a number of item prices angularly arrayed with one another, each item price presented alongside a respective one of the user-selectable item icons at each viewable successive item-icon position at which the user-selectable item icon is presented.

47. The device of claim 46 wherein to cause a presentation of a number of item prices angularly arrayed with one another includes to cause the presentation of the number of item prices at each of the viewable successive item-icon positions along the arc where each of the items prices has a fixed orientation relative to the screen, the orientation of each of the item prices relative to the screen being the same at each of the viewable successive item-icon positions along the arc.

48. The device of claim 25 wherein the executable instructions or data which, when executed by the at least one processor, causes the at least one processor to further:
cause a presentation of a menu of user selectable delivery locations.

49. At least one non-transitory machine-readable medium containing instructions that, when executed on a processor of a mobile computing device, cause the device to perform operations including:
initially causing a presentation of a first subset of the set of user-selectable item icons on a screen, in which a plurality of the user-selectable item icons comprising the first subset are angularly arrayed along an arc, wherein the arc is defined as curving about at least one virtual point located off the screen;
in response to a first scroll input,
causing a series of iterative presentations of the user-selectable item icons comprising the first subset in which the user-selectable item icons comprising the first subset are presented at a plurality of viewable successive item-icon positions along the arc angularly movable in a first direction along the arc; and
as one of the user-selectable item icons that is part of the first subset moves angularly past a second end of the arc, causing a presentation proximate a first end of the arc of at least a portion of a user-selectable item icon of the set of user-selectable item icons that was not part of the first subset of the set of user-selectable item icons;
wherein the set of user-selectable item icons has a quantity of item icons that exceeds a sum of (a) a first quantity of the plurality of viewable successive item-icon positions along the arc and (b) a second quantity of a non-viewable virtual plurality of successive item-icon positions of a virtual extension of the arc defined as curving, off the screen, about the at least one virtual point, between the first and the second ends of the arc.

50. The at least one non-transitory machine-readable medium of claim 49, wherein the operations further include:
causing a series of iterative presentations of the user-selectable item icons comprising the first subset in which the user-selectable item icons comprising the first subset are presented at a plurality of viewable successive item-icon positions along the arc in a first direction along the arc includes causing the series of iterative presentations of the user-selectable item icons in which the plurality of the user-selectable icons comprising the first subset are angularly arrayed at equally spaced intervals along the arc.

51. The at least one non-transitory machine-readable medium of claim 49, wherein the operations further include:
detecting a first swipe as the first scroll input that extends predominately in the first direction along the arc; and
in response to a second scroll input,
causing a series of iterative presentations of the user-selectable item icons comprising a second subset in which the user-selectable item icons comprising the second subset are presented at a plurality of viewable successive item-icon positions along the arc; and
as one of the user-selectable item icons that is part of the second subset iterates angularly past one end of the arc, causing a presentation proximate another end of the arc of at least a portion of a user-selectable item icon of the set of user-selectable item icons that was not part of the second subset.

52. The at least one non-transitory machine-readable medium of claim 51, wherein the screen has a first edge and at least a second edge, the second edge opposed to the first edge, and wherein causing a presentation proximate a first end of the arc of at least a portion of a user-selectable item icon of the set of user-selectable item icons that was not part of the first subset includes causing the presentation to iteratively present a progressively increasing portion of the user-selectable item icon that was not part of the first subset entering the screen along the first edge thereof.

53. The at least one non-transitory machine-readable medium of claim 51, wherein the screen has a first edge, a second edge, a third edge, and a fourth edge, a first corner where the first edge intersects the third edge and a second corner where the second edge intersects the third edge, and wherein causing a presentation proximate a first end of the arc of at least a portion of a user-selectable item icon of the set of user-selectable item icons that was not part of the first subset includes causing the presentation to iteratively present a progressively increasing portion of the user-selectable item icon that was not part of the first subset entering the screen at the first corner.

54. The at least one non-transitory machine-readable medium of claim 49, wherein causing iterative presentations of the user-selectable item icons includes causing iterative presentations of respective images of respective items the images which can be selected via an input; and further comprising:

in response to a selection of one of the user-selectable item icons, presenting a close up image of a portion of the respective item, along with a set of ingredients that comprise the respective item.

55. The at least one non-transitory machine-readable medium of claim 49 wherein causing a series of iterative presentations of the user-selectable item icons comprising the first subset in which the user-selectable item icons comprising the first subset are presented at a plurality of viewable successive item-icon positions along the arc in a first direction along the arc includes causing the iterative presentations of respective images of respective items each with a fixed orientation relative to the screen, the orientation of each of the images relative to the screen being the same at each of the viewable successive item-icon positions along the arc.

56. The at least one non-transitory machine-readable medium of claim 49, further comprising:

causing a presentation of a number of user-selectable add icons angularly arrayed with one another, each user-selectable add icon presented alongside a respective one of the user-selectable item icons at each iterative position at which the user-selectable item icon is presented.

57. The at least one non-transitory machine-readable medium of claim 49, wherein the first quantity and the second quantity, together, are at least ten times the first quantity.

58. The device of claim 22, wherein the first quantity and the second quantity, together, are at least ten times the first quantity.

59. The method of claim 1, wherein the first quantity and the second quantity, together, are at least ten times the first quantity.

* * * * *